United States Patent [19]

Shirahama et al.

[11] Patent Number: 5,016,738
[45] Date of Patent: May 21, 1991

[54] AUTOMATIC TRANSMISSION SHIFT CONTROL DEVICE

[75] Inventors: Katsunori Shirahama, Atsugi; Satoshi Kobayashi, Hiratsuka; Michihiro Okuda, Zama; Takashi Maruta, Hiratsuka; Motohiro Saito, Kosai; Hiroshi Yamazaki, Yokohama, all of Japan

[73] Assignees: Nissan Motor Co., Ltd., Yokohama; Nissan Shatai Company, Limited, Hiratsuka; Ohi Seisakusho Co., Ltd., Yokohama; Fuji Kiko Co., Ltd., Tokyo, all of Japan

[21] Appl. No.: 441,867

[22] Filed: Nov. 27, 1989

[30] Foreign Application Priority Data

Nov. 28, 1988 [JP] Japan .................. 63-301267

[51] Int. Cl.$^5$ .................................... B60K 41/26
[52] U.S. Cl. .......................... 192/4 A; 74/483 R; 180/271
[58] Field of Search ............. 192/4 R, 4 A, 4 C; 74/473 P, 483 R; 180/271

[56] References Cited

U.S. PATENT DOCUMENTS

| 4,473,141 | 9/1984 | Mochida | 192/1.1 |
| 4,884,668 | 12/1989 | Kobayashi et al. | 192/4 A |
| 4,909,096 | 3/1990 | Kobayashi | 192/4 A X |

FOREIGN PATENT DOCUMENTS

| 0246353 | 11/1987 | European Pat. Off. . |
| 0300268 | 1/1989 | European Pat. Off. . |
| 60-185750 | 12/1985 | Japan . |

Primary Examiner—Richard Lorence
Attorney, Agent, or Firm—Foley & Lardner

[57] ABSTRACT

In an automatic transmission shift control device, a rocking lever and a second biasing unit are provided for holding a selector lever in a shiftable condition when the selector lever is in one of the gear positions other than a parking position. A first biasing unit is provided for holding the selector lever in a locked condition when the selector lever is in the parking position. A solenoid is provided for releasing the selector lever from a locked condition when energized. The solenoid is energized only when a brake pedal is fully depressed under a condition where an ignition key is in an "ON" position and the selector lever is in the park position.

10 Claims, 8 Drawing Sheets

AUTOMATIC TRANSMISSION SHIFT CONTROL DEVICE

BACKGROUND OF THE INVENTION

1. Field of the Invention

The present invention relates in general to automatic transmissions and more particularly to an automatic transmission shift control device adapted to prevent shift of gears from P (parking) to other gears unless the brake pedal is fully depressed.

2. Description of the Prior Art

An example of an automatic transmission shift control device of the above described kind is shown in Japanese Utility Model provisional Publication No. 60-185750.

A problem of the prior art shift control device is that the solenoid pin of the solenoid is liable to be deformed to cause malfunction of the shift control device since, if the selector lever in a locked condition is subjected to an operating force for shifting gears, the solenoid pin receives the operating force to resist movement of the selector lever. This problem can be solved by increasing the strength of the solenoid pin so that the solenoid pin is not deformed by such an operating force. However, this causes another problem since the solenoid becomes enlarged which increases the manufacturing cost, weight and design and layout restrictions.

With a view to solving the above problem, an automatic transmission shift control device has been proposed as disclosed in U.S. patent application Ser. No. 214,068 filed on July 1, 1989, issued Dec. 5, 1989 as U.S. Pat. No. 4,884,668 and assigned to the same assignees of this application. This control device is constructed so that a solenoid needs to be kept energized in order to hold the device in a condition of permitting a shift of gears.

SUMMARY OF THE INVENTION

In accordance with the present invention, there is provided an improved automatic transmission shift control device for a vehicle having a brake pedal and an ignition key.

The shift control device comprises a selector lever movable into a plurality of gear positions including a parking position and having a hollow cylindrical post formed with a pair of diametrically opposed openings, and means for preventing movement of the selector lever out of the parking position unless the brake pedal is depressed.

This means includes a position plate having an opening defining said gear positions, a position pin installed transversely of the post in the openings for up-and-down movement and releasably engaged with the position plate for positioning the selector lever in one of the gear positions, a reciprocative rod installed in the post for up-and-down movement and attached at the lower end thereof to the position pin at the, a bushing mounted on the post for rotation but against axial movement and having diametrically opposed openings which the position pin is movable into for disengagement from the position plate, a solenoid operatively connected to the bushing for driving, when energized, said bushing into a first position where the openings of the bushing are aligned with the position pin, first biasing means for urging the bushing toward a second position where the openings of the bushing are misaligned with the position pin when the solenoid is deenergized, a rocking lever rotatable between a first position where it is engaged with the bushing for holding same in the first position and a second position where it is disengaged with the bushing for allowing same to move into said second position under the bias of the first biasing means, second biasing means for driving the rocking lever against the bias of the first biasing means into the first position of the rocking lever when the selector lever is one of the gear positions other than the parking position, stopper means for driving the rocking lever against the bias of the second biasing means into the second position of the rocking lever when the selector lever is in the parking position, and electric circuit means for energizing the solenoid only when the brake pedal is fully depressed under the condition where the ignition key is in an "ON" position and the selector lever is in the parking position.

The above structure makes it possible to solve the above noted problem and at the same time reduce supply of current to the solenoid.

It is accordingly an object of the present invention to provide an automatic transmission shift control device which can reduce the possibility of damage or malfunction and provide an assured operation.

It is another object of the present invention to provide an automatic transmission shift control device of the above described character which can reduce the power consumption.

It is a further object of the present invention to provide an automatic transmission shift control device which can reduce supply of current to a solenoid in operation, i.e., reduce the load on the solenoid.

It is a further object of the present invention to provide an automatic transmission shift control device of the above described character which is assuredly prevented from malfunctioning and is desirable from the passenger's safety point of view.

DESCRIPTION OF THE PREFERRED EMBODIMENTS

Figure 1:
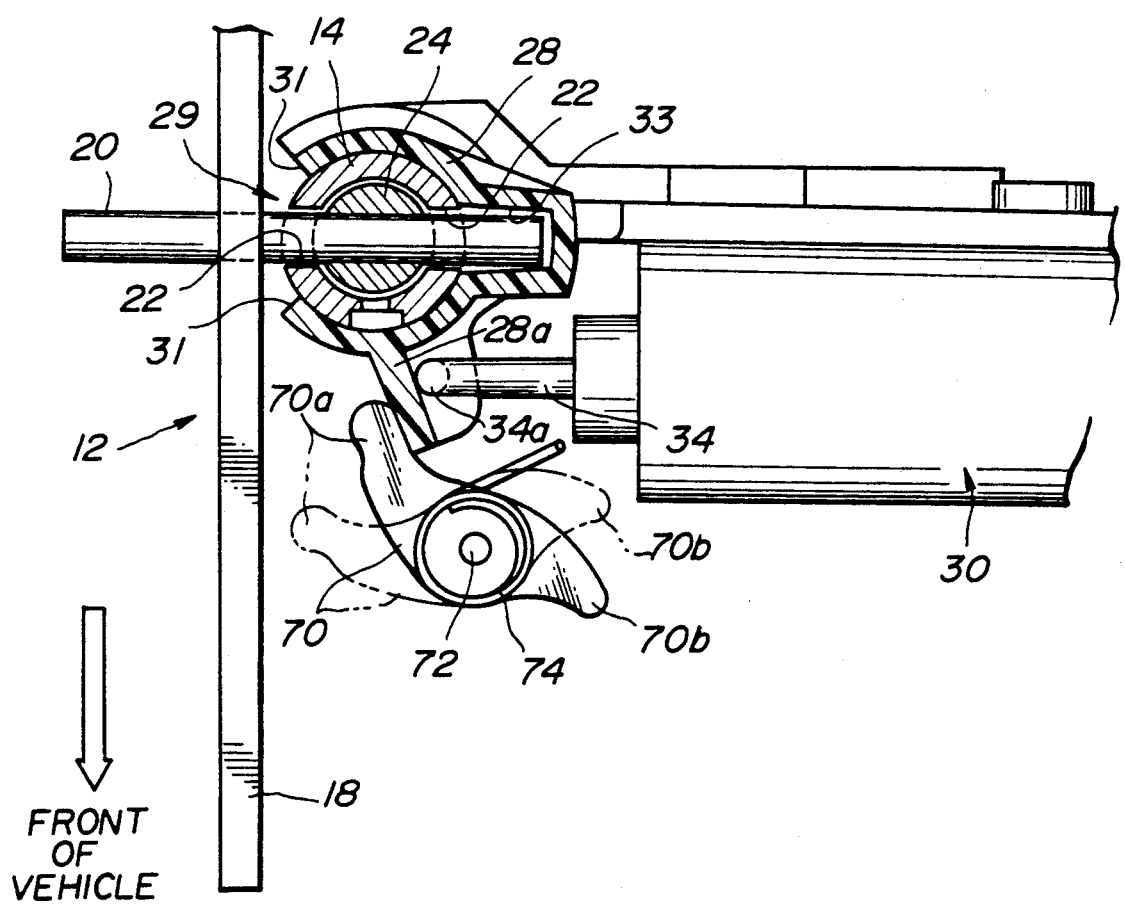
FIG. 1 is a sectional view of a principal portion of an automatic transmission shift control device according to an embodiment of the present invention.
Figure 2:
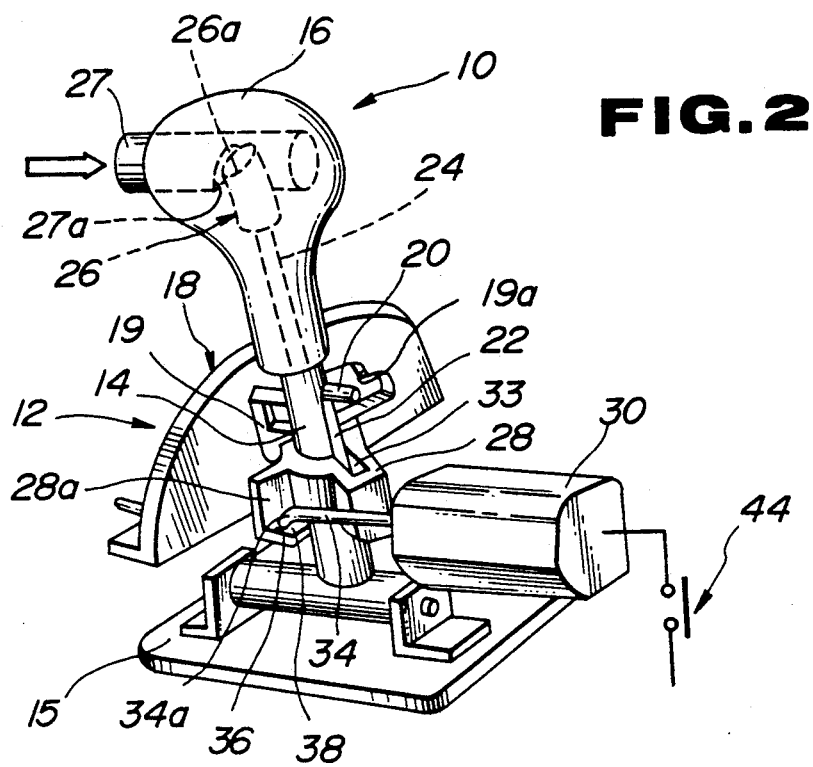
FIG. 2 is a perspective view of the shift control device of FIG. 1 in an operative position of preventing shift of gears.
Figure 3:
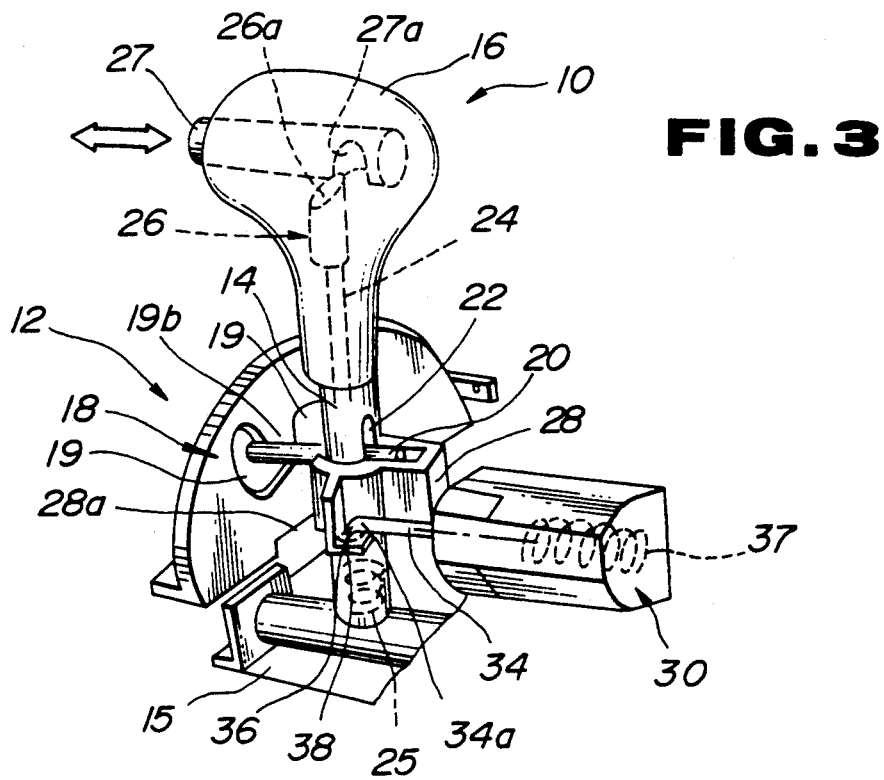
FIG. 3 is a view similar to FIG. 2 but shows the same device in an operative position of permiting shift of gears.
Figure 4:
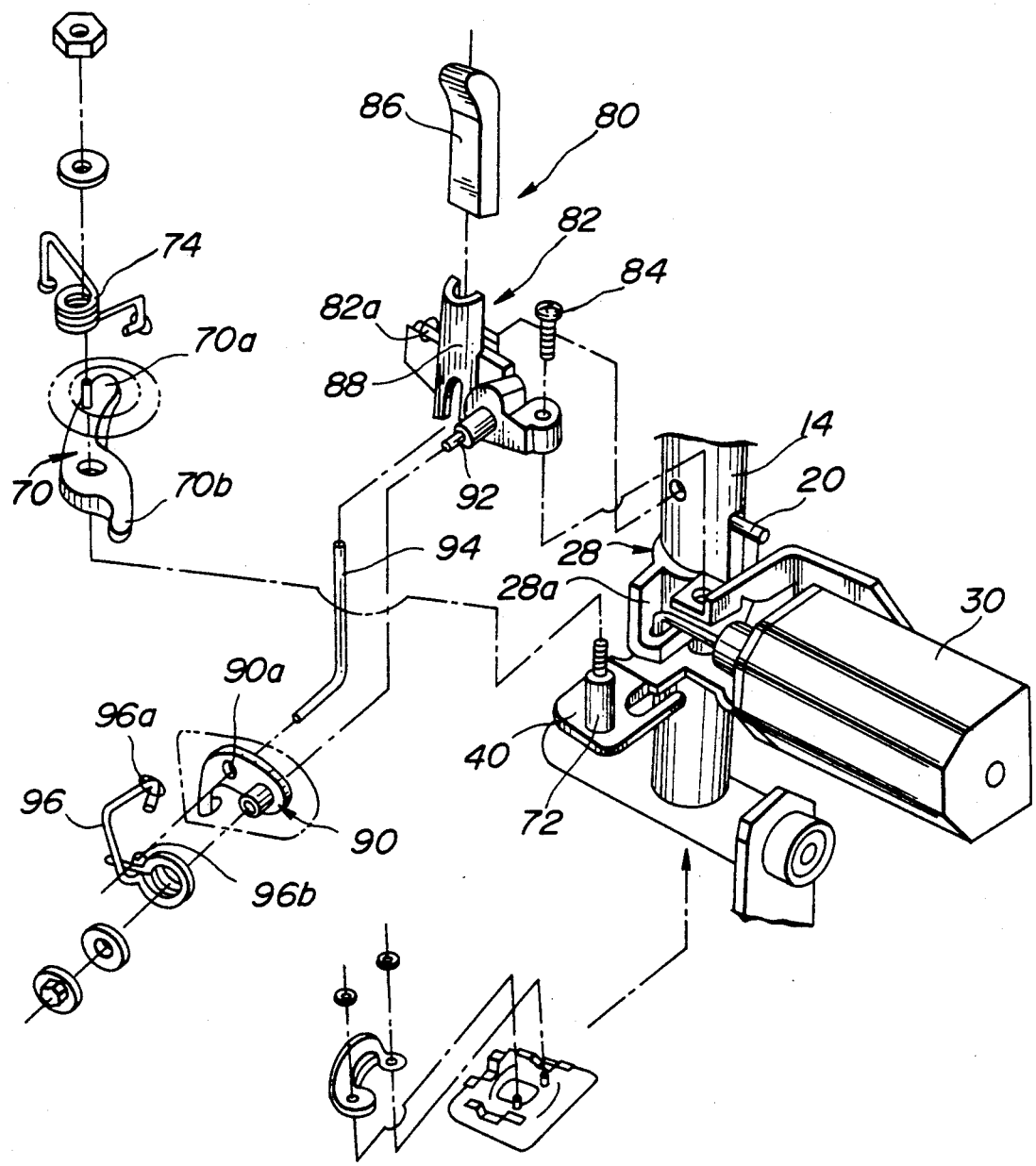
FIG. 4 is an exploded view of the shift control device of FIG. 1.
Figure 5:
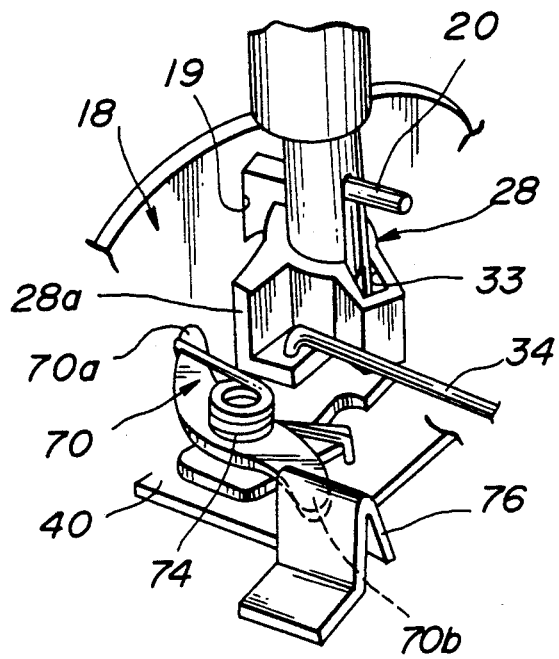
FIG. 5 is a fragmentary perspective view of the shift control device of FIG. 1 and shows a rocking lever abuttingly engaged with a stopper.
Figure 6:
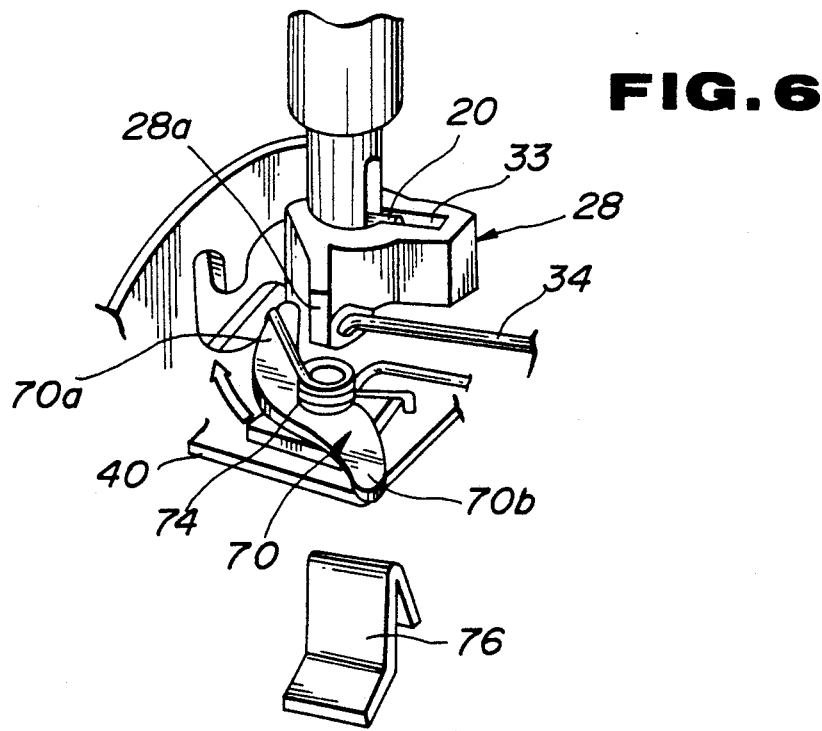
FIG. 6 is a view similar to FIG. 5 but shows the rocking lever disengaged from the stopper.
Figure 7:
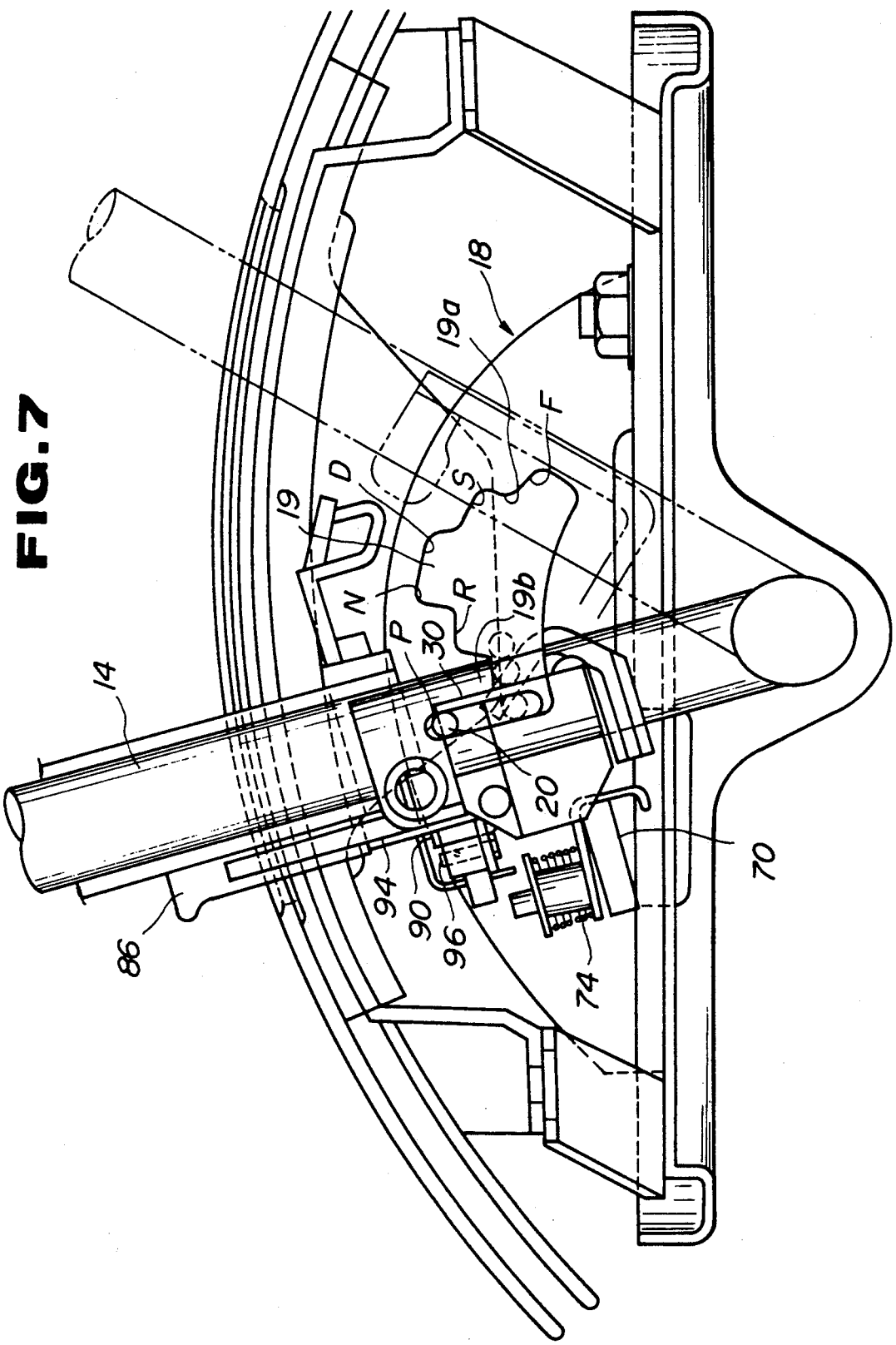
FIG. 7 is a side elevational view of the shift control device of FIG. 1.
Figure 8:
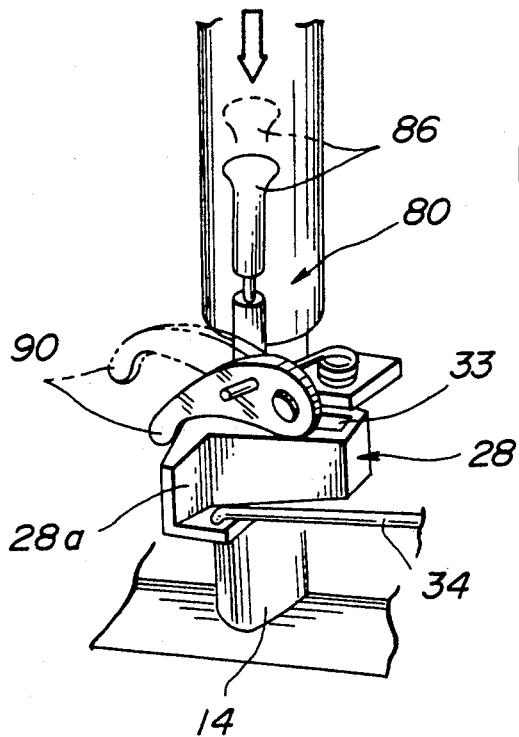
FIG. 8 is a perspective view of the shift control device of FIG. 1 and shows a manual actuating unit for manually actuating the device into a condition of permitting shift of gears.

Referring to FIGS. 1 to 9, an automatic transmission shift control device according to an embodiment of the present invention is shown as comprising a selector lever 10 and a selector lever shift control unit 12 for controlling shift or movement of the selector lever 10.

The selector lever 10 is swingable into various gear positions including a "P (parking)" position for shifting gears of an associated automatic transmission (not shown). The selector lever 10 consists of a hollow cylindrical post 14 pivotally mounted at the lower end on a vehicle body 15 and a knob 16 attached to the upper end of the post 14.

The selector lever shift control unit 12 includes a position plate 18 of an L-like cross section and having a horizontal wall portion and vertical wall portion. The position plate 18 is secured at the horizontal wall portion to the vehicle body 15. At the vertical wall portion, the position plate 18 is formed with an opening 19 having a profiled upper edge 19a for engagement with a position pin 20 and thereby locating the selector lever 10 in various gear positions including P (park), R (reverse), N (neutral), D (drive), S (2nd gear) and F (1st gear). The post 14 is formed with a pair of diametrically opposed openings 22 and 22 for receiving therein the position pin 20. The openings 22 and 22 are elongated axially of the post 14 for allowing up-and-down movement of the position pin 20 relative to the post 14 and the position plate 18. The position pin 20 extends across or transversely of the post 14 and has opposite ends projecting outwardly from the openings 22 and 22. A reciprocative rod 24 is installed in the post 14 and knob 16 for up-and-down movement. The reciprocative rod 24 is attached at the lower end to the position pin 20 for movement together with same. A slide cam 26 having a tapered cam surface portion 26a is installed in the knob 16 and attached to the upper end of the rod 24 for up-and-down movement with same. A coil spring 25 (see FIG. 3) is installed in the post for urging the rod 24 and slide cam 26 upwardly together with the position pin 20. A control button 27 is installed in the knob 16 for horizotal movement and has a cam surface portion 27a for engagement with the cam surface portion 26a of the slide cam 26 so that pushing the control button 27 inwardly of the knob 16 or allowing the former to project outwardly from the latter causes downward or upward movement of the slide cam 26 and rod 24 together with the position pin 20. A bushing 28 in the form of a generally part-circular band or a split ring is concenctrically mounted on the post 14 for rotation, but against axial movement. The bushing 28 has a radial opening 29 between the opposite circumferential ends 31 and 31. The bushing 28 also has an axial opening 33 defined by a channel-shaped circumferential wall portion 35. The axial opening 33 extends throughout the length of the bushing 28 and diametrically opposes to the opening 29. The position pin 20 moves up-and-down in the openings 29 and 33 during movement of the selector lever 10 from the "P" position into other gear positions. In other words, in order to shift the selector lever 10 from the "P" position to other gear positions, it is necessary to place the position pin 20 in the lower end portions of the openings 22 and 22. This cannot be attained unless the position pin 20 is received in the openings 29 and 33.

A solenoid 30 is connected to the bushing 28 by way of a solenoid pin 34 which has an end 34a engaged in an opening 36 formed in an outer peripheral projection 38 of the bushing 28. When the solenoid 30 is deenergized, the solenoid pin 34 projects being urged by a built-in spring 37. The spring 37 is adapted to serve as a first biasing unit for urging the bushing 28 toward the position where the openings 29 and 33 are misaligned with the position pin 20. When the solenoid 30 is energized, the solenoid pin 34 retracts prevailing the bias of the spring 37.

The solenoid 30 is energized only when a brake pedal 41 is fully depressed under a condition where the selector lever 10 is in the "P" position and an ignition key 43 is in the "ON" position. When the solenoid 30 is energized, the bushing 28 is driven against the bias of the spring 37 into the position where the openings 29 and 33 are aligned with the position pin 20 as shown in FIG. 1. Unless the brake pedal 41 is fully depressed, the solenoid 30 is not energized even when the selector lever 10 is in the "P" position and the ignition key 43 is in the "ON" position. A solenoid support bracket 40 is secured to the post 14 to move together therewith. The solenoid 30 and the bushing 28 are installed on the bracket 40.

A pin 72 is attached to the bracket 40 to extend upwardly therefrom. A rocking lever 70 is installed on the pin 72. The rocking lever 70 is swingable or rotatable in a nearly or substantially horizontal plane about the pin 72 and has opposite ends 70a and 70b. The bushing 28 has a radial flange 28a, which one end 70a of the rocking lever 70 is abuttingly engageable with. A coil spring 74 is installed concentrically on the pin 72 to urge the rocking lever 70 clockwise in FIG. 1. By this, the one end 70a of the rocking lever 70 is abuttingly engageable with the radial flange 28a for driving the bushing 28 against the bias of the built-in spring 37 of the solenoid 30 into the position where the openings 29 and 33 are aligned with the position pin 20 as shown in FIG. 1, i.e., for driving the solenoid pin 34 into a most retracted position. The spring 74 thus serves as a second biasing unit for urging the bushing 28 in opposition to the first biasing unit 37.

A stopper 76 is secured to the vehicle body 15 to project upwardly therefrom. The stopper 76 is abuttingly engageable with the other end 70b of the rocking lever 70 when the selector lever 10 is moved into the "P" position from other gear positions. When the other end 70b of the rocking lever 70 is abuttingly engaged with the stopper 76, the one end 70a is driven away from the radial flange 28a of the bushing 28 as shown by the two-dot chain line in FIG. 1. When the selector lever 10 is in the "P" position to abuttingly engage the rocking lever 70 with the stopper 76 as above and the solenoid 30 is not engergized, the solenoid pin 34 projects into its most protruded position under the bias of the spring 37 while rotating the busing 28 into the position where the openings 29 and 33 are misaligned with the position pin 20.

Figure 9:
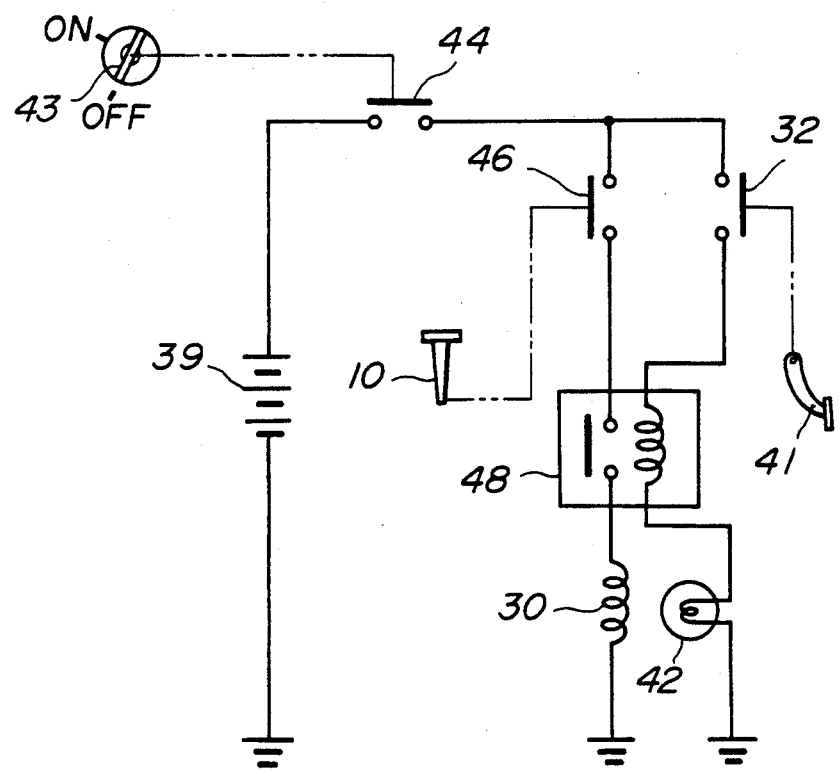
FIG. 9 is a wiring diagram of an electric circuit for controlling energization of a solenoid employed in the shift control device of FIG. 1.
Figure 10:
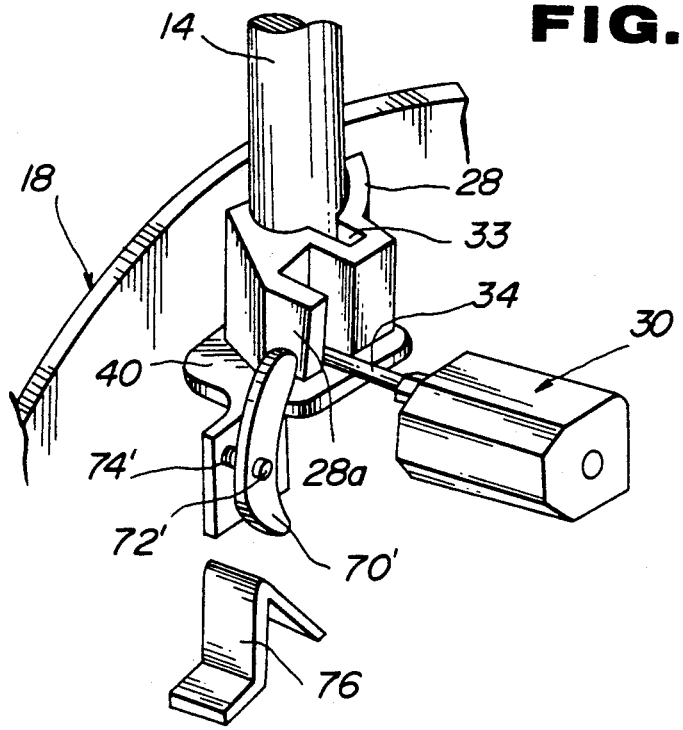
FIG. 10 is a perspective view of an automatic transmission shift control device according to another embodiment of the present invention.

Energization of the solenoid 30 is controlled by an electric circuit shown in FIG. 9. The electric circuit includes a stop switch 32 which is closed when the brake pedal 41 is fully depressed and opened when released from the depression. The stop switch 32 is connected in series with a d.c. source 39 by way of an ignition key position detecting switch 44 and also with a stop lamp 42 by way of an electric coil of a relay 48. The ignition key position detecting switch 44 is closed when the ignition key 43 is in the "ON" position and opens when in the "OFF" position. A selector lever position detecting switch 46 is disposed between the ignition key position detecting swtich 44 and the relay 48 and connected in series with same. The switch 46 is closed when the selector lever 10 is in the "P" position and opened when in any of the gear positions positions other than "P". The switch 46 is disposed in parallel with relation to the stop switch 32. The relay 48 is disposed between the switch 46 and a solenoid 30 for controlling electrical connection between the same.

With the foregoing structure, when the selector lever 10 is in the "P" position, the rocking lever 70 is abuttingly engaged at the other end 70b with the stopper 76. The one end 70a of the rocking lever 70 is thus held disengaged from the radial flange 28a of the bushing 28. Under this condition, when the brake pedal 41 is not fully depressed and therefore the stop switch 32 is opened, the solenoid 30 is deenergized, and therefore the bushing 28 is rotated under the bias of the built-in spring 37 of the solenoid 30 into the position where the openings 29 and 33 are misaligned with the position pin 20. On the other hand, when the brake pedal 41 is fully depressed under the condition where the ignition key 43 is in the "ON" position and the selector lever 10 is in the "P" position, the ignition key position detecting switch 44, the selector lever position detecting switch 46 and the stop switch 32 are all closed, thus allowing the relay 48 to be closed to provide electrical connection between the switch 46 and the solenoid 30. The solenoid 30 is thus energized to drive the solenoid pin 34 into its most retracted position against the bias of the spring 37. By this, the bushing 28 is rotated into the position where the openings 29 and 33 are aligned with the position pin 20. The position pin 20 is thus movable into the lower end portions of the openings 22 and 22 by pushing the control button 27 into the knob 16. When the position pin 20 is placed in the lower end portions of the openings 22 and 22, it becomes possible for the position pin 20 to clear or go over the stopper portion 19b of the position plate 18. The selector lever 10 is therefore movable from the "P" position to other gear positions.

When the selector lever 10 is shifted to one of the gear positions other than "P", the selector lever position detecting switch 46 is opened, thus allowing the solenoid 30 to be deenergized. However, the bushing 28 is held in the position where the openings 29 and 33 are aligned with the solenoid pin 20 under the bias of the spring 74. This is because the other end 70b of the rocking lever 70 is disengaged from the stopper 76 when the selector lever 10 is shifted to one of the gear positions other than "P". The rocking lever 70 is driven by the spring 74 and abuttingly engaged at the one end 70a with the radial flange 28a of the bushing 28, thereby holding bushing 28 in the position where the openings 29 and 33 are aligned with the position pin 20 under the bias of the spring 74 prevailing the bias of the built-in spring 37 of the solenoid 30.

When a drive is finished, the selector lever 10 is shifted into the "P" position from other gear positions with the push button 27 being pushed inwardly of the knob 16. By this, the rocking lever 70 is abuttingly engaged at the other end 70b with the stopper 76 and therefore is rotated against the bias of the spring 74, thus allowing the one end 70a to be disengaged from the radial flange 28a of the bushing 28. By this, the bushing 28 is rotated under the bias of the spring 37 into the position where the openings 29 and 33 are misaligned with the position pin 20. The selector lever 10 is thus put into a locked condition.

When the brake pedal 41 is not fully depressed, even under the condition where the ignition key 43 is in the "ON" position and the selector lever 10 is in the "P" position, the solenoid 30 is not energized, thus allowing the bushing 28 to be held under the bias of the built-in spring 37 of the solenoid 30 in the position where the openings 29 and 33 are misaligned with the position pin 20 since the stop switch 32 is opened and therefore there is no supply of current to the electric coil of the relay 48.

In the above, it is to be noted that the solenoid 30 is energized only when the brake pedal 32 is fully depressed. This makes it possible to considerably reduce the time during which electric current is supplied to the solenoid 30, i.e., considerably reduce the load on the solenoid 30. Thus, it becomes possible not only to increase the durability of the solenoid but to attain an assured opertion of the solenoid. Furthermore, it becomes possible to reduce the power consumption of the shift control device.

A manual actuating unit 80 is provided for manually driving the bushing 28 into the position where the openings 29 and 33 are aligned with the position pin 20. More specifically, the manual actuating unit 80 includes a guide body 82 secured to the post 14 with a screw 84, a push button 86 slidably installed in a post portion 88 of the guide body 82 for up-and-down movement, a cam plate 90 supported on a pin 92 projecting horizontally from the guide body 82, for rotataion in a nearly or substantially vertical plane, an L-like rod 94 having a vertical portion received in the post portion 88 and attached to the push button 86 and a horizontal portion extending through an opening 90a of the cam plate 90, and a coil spring 96 having an end 96a engaged with an arm portion 82a of the guide body 82 and the other end 96b engaged with the horizontal portion of the rod 94 in such a way as to urge the rod 94 upwardly.

With the manual actuating unit 80, the bushing 28 can be manually rotated from the position where the openings 29 and 33 are misaligned with the position pin 20 to the position where the openings 29 and 33 are aligned with the position pin 20. More specifically, when the button 86 is pushed downwards against the bias of the spring 96, the cam plate 90 is rotated about the pin 92. The cam plate 90 thus pushes the radial flange 28a of the bushing 28 and thereby rotates the bushing 28 against the bias of the built-in spring 37 of the solenoid 30. By manually pushing the push button 86 sufficiently downwards, the bushing 28 thus can be rotated into the position where the openings 29 and 33 are aligned with the position pin 20. Accordingly, even in case of malfunction of the shift control device, the selector lever 10 can be released from a locked condition.

Figure 11:
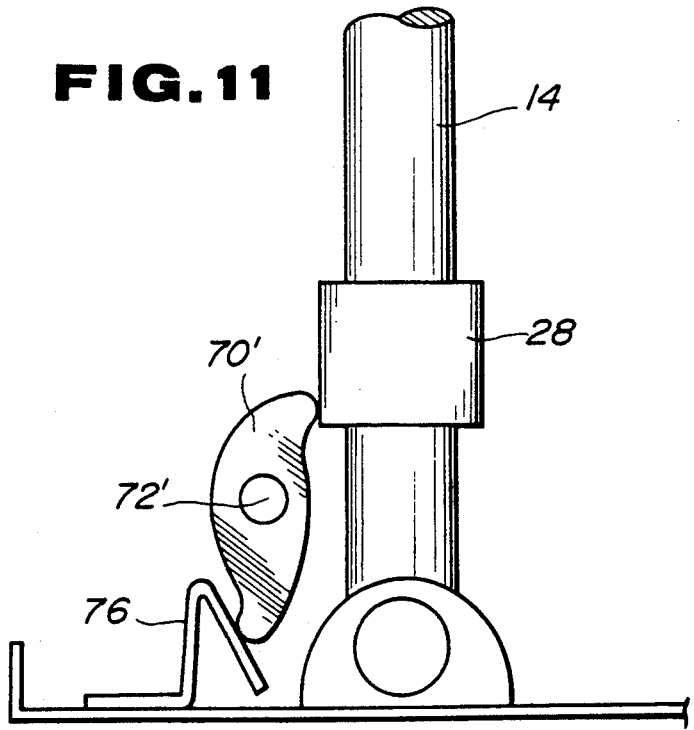
FIG. 11 is an elevational view of the shift control device of FIG. 11.
Figure 12:
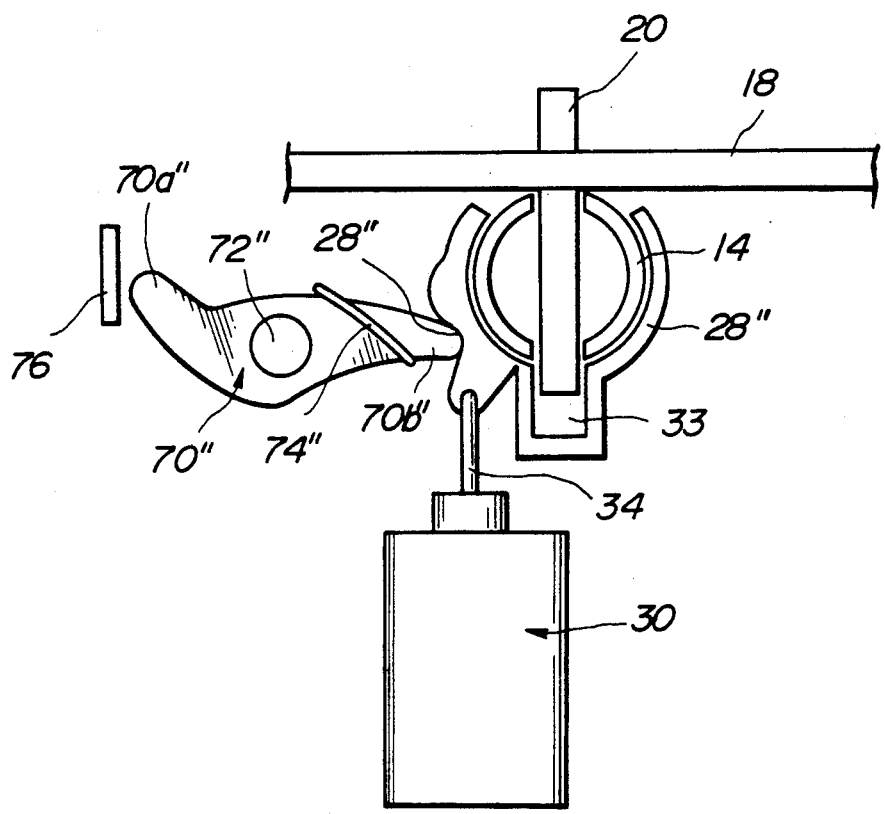
FIG. 12 is a top plan view of an automatic transmission shift control device according to a further embodiment of the present invention.

FIGS. 11 and 12 show another embodiment which is substantially similar to the previous embodiment except that the rocking lever 70' is installed vertically, i.e., installed so as to be rotatable in a vertical plane. To this end, a pin 72' is provided which extends horizontally from the bracket 40. The rocking lever 70' is installed on the pin 72' to rotate therearound. A spring 74' is provided for urging the rock lever 70' clockwise in FIG. 11.

FIG. 12 shows a further embodiment which is substantially similar to the previous embodiment of FIGS. 1 to 9 except that the rocking lever 70" is urged by a spring 74" counterclockwise in FIG. 12 and that a recessed portion 28b of the bushing 28 which the other end portion 70b" of the rocking lever 70" is engaged in is shaped so as to prevent further counterclockwise rotation of the rocking lever 70" from the position shown in FIG. 12 but permit clockwise rotation. When the selector lever 10 is shifted into the "P" position, the one end portion 70a" of the rocking lever 70" is rotated clockwise and disengaged from the recessed portion 28b" of the bushing 28", thus allowing the bushing 28" to move, under the bias of the built-in spring 37 of the solenoid 30, into the position where the openings 29 and 33 are misaligned with the position pin 20. With this arrangement, even if the spring 74" is damaged or broken, the rocking lever 70" can hold the bushing 28" in the position where the openings 29 and 33 are aligned with the position pin 20 even when the solenoid 30 is deenergized, thus making it possible to prevent malfunction resulting from damage or breakage of the spring 74".

What is claimed is:

1. An automatic transmission shift control device for a vehicle having a brake pedal and an ignition key, comprising:

a selector lever movable into a plurality of gear positions including park position and having a hollow cylindrical post formed with a pair of diametrically opposed openings; and means for preventing movement of said selector lever out of the park position unless the brake pedal is depressed;

said means including a position plate having an opening defining said gear positions, a position pin installed transversely of said post in said openings for up-and-down movement and releasably engaged with said position plate for positioning said selector lever in one of said gear positions, a reciprocative rod installed in said post for up-and-down movement and attached at the lower end thereof to said position pin, a bushing mounted on said post for rotational movement, but against axial movement and having diametrically opposed openings which said position pin is movable into for disengagement from said position plate, a solenoid operatively connected to said bushing for driving, when energized, said bushing into a first position where said openings of said bushing are aligned with said position pin, first biasing means for urging said bushing toward a second position where said openings of said bushing are misaligned with said position pin when said solenoid is deenergized, a rocking lever rotatable between a first position where it is engaged with said bushing for holding the same in said first position and a second position where it is disengaged with said bushing for allowing the same to move into said second position under the bias of said first biasing means, second biasing means for driving said rocking lever against the bias of said first biasing means into said first position of said rocking lever when said selector lever is one of the gear positions other than the park position, stopper means for driving said rocking lever against the bias of said second biasing means into said second position of said rocking lever when said selector lever is in the park position, and electric circuit means for engaging said solenoid only when the brake pedal is fully depressed under the condition where the ignition key is in an "ON" position and said selector lever is in the park position.

2. An automatic transmission shift control device as claimed in claim 1, wherein said rocking lever, said first biasing means, said second biasing means and said solenoid are movable together with said selector lever and relative to said stopper means.

3. An automatic transmission shift control device as claimed in claim 2, wherein said rocking lever, said first biasing means, said second biasing means and said solenoid are installed on a common bracket attached to said post.

4. An automatic, transmission shift control device as claimed in claim 3, wherein said stopper means comprises a stopper attached to a stationary body portion of the vehicle and wherein said rocking lever is rotatably installed on said bracket and has opposite ends, one of said ends of said rocking lever being engageable with said bushing under the bias of said second biasing means, the other of said ends of said bushing being engageable with said stopper for disengaging said one end from said bushing against the bias of said second biasing means.

5. An automatic transmission shift control device as claimed in claim 4, wherein said rocking lever is rotatable about a pin and said second biasing means comprises a coil spring installed concentrically with said pin.

6. An automatic transmission shift control device as claimed in claim 1, wherein said first biasing means comprises a coil spring built in said solenoid.

7. An automatic transmission shift control device as claimed in claim 1, wherein said selector lever further includes a knob attached to an upper end of said post, and wherein said control means further comprises a control button mounted in said knob for substantially horizontal movement and cooperative with said reciprocative rod to disengage said position pin from said position plate.

8. An automatic transmission shift control device as claimed in claim 1, wherein said bushing is in the form of a part-circular band and has a channel-shaped circumferential wall portion for defining one of said openings of said bushing, the other of said openings of said bushing being defined between opposite circumferenital ends of said bushing.

9. An automatic transmission shift control device as claimed in claim 1, wherein said bushing has a radial flange for engagement with said rocking lever.

10. An automatic transmission shift control device as claimed in claim 1, further comprising manual actuating means for manually actuating said bushing into said first position against the bias of said first biasing means when said selector lever is in the park position.

* * * * *